(12) United States Patent
Matsunaga et al.

(10) Patent No.: US 6,448,681 B1
(45) Date of Patent: Sep. 10, 2002

(54) ALTERNATOR

(75) Inventors: Kazuo Matsunaga; Atsushi Oohashi; Yoshihito Asao, all of Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/664,744

(22) Filed: Sep. 19, 2000

(30) Foreign Application Priority Data

Feb. 24, 2000 (JP) ........................................ 2000-047795

(51) Int. Cl.[7] .................................................. H02K 1/00
(52) U.S. Cl. ........................................ 310/179; 310/260
(58) Field of Search .............................. 310/179, 254, 310/201, 216, 180, 195, 203, 208, 214, 215, 258, 260, 261

(56) References Cited

U.S. PATENT DOCUMENTS 6,208,060 B1 * 3/2001 Kusase et al. .............. 310/254

FOREIGN PATENT DOCUMENTS

| EP | 0 881 747 | 12/1998 |
| EP | 0881750 | 12/1998 |
| EP | 0923187 | 6/1999 |
| JP | 11-341730 | 12/1999 |

OTHER PUBLICATIONS

Patent Abstracts of Japan, vol. 006, No. 230, Nov. 16, 1982.
Patent Abstracts of Japan, vol. 2000, No. 09, Oct. 13, 2000.

* cited by examiner

*Primary Examiner*—Nestor Ramirez
*Assistant Examiner*—Thanh Lam
(74) *Attorney, Agent, or Firm*—Sughrue Mion, PLLC

(57) ABSTRACT

An alternator is capable of preventing a short circuit at a coil end, improving an ability of cooling a stator winding assembly, and reducing noises. A multi-phase stator winding of the alternator has: a plurality of joint portions where a distal end extending in an axial direction of a first conductor portion drawn out from a first layer in a slot and a distal end extending in an axial direction of a second conductor portion drawn out from a second layer in a slot located a predetermined number of slots apart in a circumferential direction are connected outside the slot on an end surface side of the stator core; and a coil end where the joint portions are disposed in a plurality of rows in the circumferential direction. The joint portions are set apart by half a slot from a diametrical line in a circumferential direction.

17 Claims, 12 Drawing Sheets

COOLING AIR EXHAUST DIRECTION

ROTATIONAL DIRECTION

ALTERNATOR

BACKGROUND OF THE INVENTION

1. Field of the Invention

The present invention relates to an automotive alternator mounted on a vehicle, such as a passenger car or a truck, and more particularly, to a stator winding of stator of the automotive alternator.

2. Description of the Related Art

FIG. 15 is a sectional view of a conventional automotive alternator.

The automotive alternator is constituted by a Lundell-type rotor 7 rotatably installed via a shaft 6 in a case 3 composed of an aluminum front bracket 1 and an aluminum rear bracket 2, and a stator 8 secured to an inner wall of the case 3 so as to cover an outer peripheral of the rotor 7.

The shaft 6 is rotatably supported by the front bracket 1 and the rear bracket 2. A pulley 4 is secured to one end of the shaft 6 to allow rotating torque of an engine to be transmitted to the shaft 6 via a belt (not shown).

Slip rings 9 are secured to the other end of the shaft 6 to supply electric current to the rotor 7, and a pair of brushes 10 are accommodated in a brush holder 11 disposed in the case 3 so that the brushes 10 slide in contact with the slip rings 9. A regulator 18 for adjusting a magnitude of ac voltage generated at the stator 8 is adhesively attached to a heat sink 17 fitted in the brush holder 11. A rectifier 12 which is electrically connected to the stator 8 and rectifies alternating current produced in the stator 8 into direct current is installed in the case 3.

The rotor 7 is constructed by a rotor coil 13 for generating magnetic flux on passage of electric current, and a pair of pole cores 20 and 21 which are provided to cover the rotor coil 13 and in which magnetic poles are formed by the magnetic flux generated by the rotor coil 13. The pair of pole cores 20 and 21 is made of iron and has a plurality of claw-shaped magnetic poles 22 and 23 arranged at equiangular pitches in a circumferential direction on outer peripheries thereof, and is secured to the shaft 6 such that the pole cores 20 and 21 oppose each other with the claw-shaped magnetic poles 22 and 23 intermeshed. Furthermore, centrifugal fans 5 are secured to both axial end surfaces of the rotor 7.

The stator 8 is constructed by a stator core 15 and a stator winding assembly 16 formed by a conductor wound around the stator core 15 and in which alternating current is produced by changes in magnetic flux from the rotor 7 as the rotor 7 rotates.

A structure of the stator winding assembly 16 will now be described in conjunction with FIG. 16 illustrating the winding.

The stator winding assembly 16 is formed by an a-phase stator winding member 16a, a b-phase stator winding member, and a c-phase stator winding member. The a-phase stator winding member 16a, the b-phase stator winding member, and the c-phase stator winding member are disposed such that they are shifted by one slot 15a from one another and are in a star connection.

FIG. 16 illustrates a winding structure of the a-phase stator winding assembly 16a; it does not illustrate winding structures of the b-phase stator winding member and the c-phase stator winding member. In FIG. 16, solid lines denote conductors connected to the rear bracket 2 (coupling portions of conductor segments, which will be discussed hereinafter), and dotted lines denote conductors connected to the front bracket 1 (coupling portions of the conductor segments which will be discussed hereinafter).

The a-phase stator winding assembly 16a is equipped with a first winding 54 and a second winding 55. The first winding 54 connected to an a-phase lead wire 100 begins at a second layer (hereinafter, a first layer from an outer peripheral side will be indicated by "address 1", a second layer by "address 2", a third layer by "address 3", and a fourth layer by "address 4") from an outer peripheral side in the slot 15a of slot number 1, and extends counterclockwise into a slot 15a at address 1 of slot number 4 from the front bracket 1 side. The first winding 54 further extends clockwise from the rear bracket 2 side into a slot 15a at address 4 of slot number 4, and exits to the front bracket 1 side. Then, the first winding 54 extends counterclockwise into a slot 15a at address 3 of slot number 4 from the front bracket 1 side, and exits to the rear bracket 2 side. Thereafter, the first winding 54 extends counterclockwise into a slot 15a at address 2 of slot number 7, and exits to the front bracket 1 side.

Thus, the conductor led out to the rear bracket 2 side at address 1, where a first layer is located in each slot 15a, enters toward the front bracket 1 at address 4, where a fourth layer is located, in a slot 15a away clockwise by three slots. Furthermore, the conductor led out to the rear bracket 2 side at address 3, where a third layer is located in each slot 15a, enters toward the front bracket 1 at address 2, where a second layer is located in a slot 15a, away by three slots counterclockwise.

Lastly, the conductor led out to the rear bracket 2 side at address 3, where a third layer is located, of slot number 34 extends counterclockwise and reaches address 1, where the first layer is located, of slot number 1, which is an end point of the first winding 54.

The end point of the first winding 54 provides a start point of the second winding 55. The second winding 55 extends clockwise and enters a slot 15a at address 2, where the second layer is located, of slot number 34 from the front bracket 1 side. Subsequently, the conductor led out from the rear bracket 2 side extends clockwise from the rear bracket 2 side, enters a slot 15a at address 3, where the third layer is located, of slot number 31, and exits to the front bracket 1 side. Then, the second winding 55 extends clockwise, enters a slot 15a at address 4 of slot number 28 from the front bracket 1 side, and exits to the rear bracket 2 side. Thereafter, the second winding 55 extends counterclockwise, enters a slot 15a at address 1 of slot number 31, and exits to the front bracket 1 side. The conductor extends clockwise and enters a slot 15a at address 2 of slot number 28.

Thus, the conductor led out to the rear bracket 2 side at address 4 in each slot 15a enters toward the front bracket 1 side at address 1 in the slot 15a located three slots away counterclockwise. Furthermore, the conductor led out to the rear bracket 2 side at address 2 in each slot 15a enters toward the front bracket 1 side at address 3 in the slot 15a located three slots away clockwise.

Lastly, the conductor led out to the front bracket 1 side at address 3 of slot number 1 extends clockwise and reaches address 4 of slot number 34, which is an end point of the second winding 55. A neutral point leader line 101 is connected to the end point.

As described above, in the a-phase stator winding member 16a, the first winding 54 connected to the a-phase lead wire 100 is wound around once counterclockwise as a whole, switching to the clockwise direction at a plurality of locations at every three slots. Then, the second winding 55 is wound around once clockwise as a whole, switching to the counterclockwise direction at a plurality of locations at every three slots. Thus, the a-phase stator winding member 16a having four turns is fabricated.

The same description of the a-phase stator winding member applies to the b-phase stator winding member and the c-phase stator winding member, so that the description will not be repeated.

The three-phase stator winding assembly 16 having the configuration set forth above is formed by joining numerous short conductor segments 50 shown in FIG. 17.

The conductor segments 50 constituting the conductor are made by forming a copper wire, which is provided with insulating coating and has a round section, into a substantially U shape. Each of the conductor segments 50 is constructed by a pair of linear portions 51a and 51b accommodated in the slot 15a, a joint portion 52 where the linear portions 51a and 51b are joined, and connecting portions 53a and 53b provided at distal ends of the linear portions 51a and 51b and which connect adjoining conductor segments 50.

A procedure for forming the a-phase stator winding member 16a by using the conductor segments 50 will now be described.

First, referring to FIG. 16, the linear portion 51a of the conductor segment 50 and the linear portion 51b, which is three slots apart, are inserted from the rear bracket 2 side at a predetermined slot number and a predetermined address. In each slot 15a, four linear portions 51a and 51b of the conductor segments 50 are arranged in a row in a radial direction.

After that, in the front bracket 1, as indicated by the dotted lines of the winding diagram of FIG. 16, the connecting portion 53a extending from the linear portion 51a and the connecting portion 53b extending from the linear portion 51b, which is three slots away, are joined to the front bracket 1 side so as to form the four-turn a-phase stator winding member 16a. As indicated by the dotted lines of FIG. 16, the connecting portions 53a of the conductor segments 50 drawn out to the front bracket 1 side from the first layer and the third layer in the slot 15a are respectively joined, at the front bracket 1 side, to the connecting portions 53b of the conductor segments 50 that are extended to the front bracket 1 side from the second layer and the fourth layer in the slot 15a that is three slots away clockwise.

The distal ends of the connecting portions 53a and 53b of the conductor segments 50 can be easily bent, and are overlapped in the radial direction substantially at a midpoint between the two slots 15a in which the conductor segments 50 are inserted. The overlapped distal ends are wrapped with clamps 29, then soldered. An inner joint portion 56 in which the distal ends of the connecting portions 53a and 53b on an inner circumferential side are joined, and an outer joint portion 57 in which the distal ends of the connecting portions 53a and 53b on an outer circumferential side are joined are disposed in a row in the radial direction as shown in FIG. 18 and FIG. 19.

In the same manner, the four-turn b-phase stator winding member and the four-turn c-phase stator winding member are fabricated, then all the three stator winding members are star-connected to make up the three-phase stator winding assembly 16.

In the automotive alternator constructed as described above, current is supplied by a battery (not shown) through the brushes 10 and the slip rings 9 to the rotor coil 13 so as to generate magnetic flux, whereby the claw-shaped magnetic pole 22 of the pole core assembly 20 is polarized with north-seeking (N) pole, while the claw-shaped magnetic pole 23 of the pole core assembly 21 is polarized with south-seeking (S) pole. The rotating torque of the engine is transmitted to the shaft 6 via the belt and the pulley 4, thereby causing the rotor 7 to rotate. This in turn causes a rotating magnetic field to be imparted to the stator winding assembly 16, and an electromotive force is generated in the stator winding assembly 16. The alternating electromotive force is converted into direct current by means of the rectifier 12, a magnitude thereof is adjusted by the regulator 18, and the battery is recharged.

In the automotive alternator, the rotor coil 13, the stator winding assembly 16, the rectifier 12, and the regulator 18 constantly generate heat during power generation. As countermeasures for the heat produced by power generation, the front bracket 1 and the rear bracket 2 are provided with intake ports 1a, 2a and exhaust ports 1b, 2b.

As indicated by chain lines in FIG. 15, at the rear side, the rotation of the centrifugal fan 5 causes outside air to be introduced through the intake ports 2a provided facing the heat sink 19 of the rectifier 12 and the heat sink 17 of the regulator 18, respectively, to cool the rectifier 12 and the regulator 18. Then, the air is curved in a centrifugal direction by the centrifugal fan 5 so as to cool a coil end 16b at the rear side of the stator winding assembly 16, and exhausted through the exhaust ports 2b.

Furthermore, at the front bracket 1 side, the rotation of the centrifugal fan 5 causes outside air to be introduced through the intake ports 1a in an axial direction, then the air is curved in a centrifugal direction by the centrifugal fan 5 so as to cool a coil end 16a at the front side of the stator winding assembly 16, and exhausted to outside through the exhaust ports 1b.

The stator winding assembly 16 generates much heat, and as it becomes hot, its output characteristic deteriorates. For this reason, the coil end 16b is positioned between the centrifugal fan 5 and the exhaust ports 1b and 2b so as to be securely cooled.

In the automotive alternator having the above construction, the inner joint portion 56 and the outer joint portion 57 are closed in the radial direction. This has been presenting a problem in that it is difficult to wrap the connecting portions 53a and 53b with the clamps 29, and solder tends to cover adjacent inner joint portions 56 or outer joint portions 57, leading to poor connecting work efficiency and a low yield.

Furthermore, since the inner joint portions 56 and the outer joint portions 57 are disposed in a row in the radial direction, it is difficult for cooling air discharged from the centrifugal fans 5 to hit the outer joint portions 57. This has been posing a problem in that temperatures of the conductor segments 50 on the outer peripheral side rise, and solder of the outer joint portion 57 melts and drips, causing short-circuit with an adjoining conductor segment 50.

There has been another problem in that the automotive alternator is mounted on the engine that incurs the severest vibrations in the automobile, so that the inner joint portions 56 and the outer joint portions 57 come in contact with each other due to the vibrations, resulting in a short circuit.

Furthermore, if the connecting portions 53a and 53b of the conductor segments 50 are joined by, for example, TIG welding instead of soldering, since the inner joint portion 56 and the outer joint portion 57 are close in the radial direction, an attempt to weld one of them frequently causes an adjoining joint portion to be welded together, presenting a problem of poor connecting work efficiency and a low yield.

In the connecting work using the TIG welding, as illustrated in FIG. 21 and FIG. 22, copper clamping jigs 40 are arranged in a straight line, distal ends of the clamping jigs 40 are butted against each other to hold the conductor segment 50, and heat is radiated by transmitting generated heat during welding via the clamping jigs 40 to heat radiating jigs 41. However, an area where the clamping jigs 40 are in contact with the conductor segment 50 is small, posing a problem in that heat is not adequately radiated at the joint portions 56 and 57 during the welding process, and the connecting portions 53a and 53b in the vicinity of the joint portions 56 and 57 incur burnt coating, making it impossible to accomplish satisfactory insulation between the conductor segments 50.

There has been still another problem in that the jigs 40 hold together the joint portions 56 and 57 arranged in a row, so that their holding performance is not reliable, leading to a likelihood of unstable TIG welding.

There has been yet another problem in that the jigs 40 are made of soft copper, and the tapered jigs 40 are abutted against each other. Therefore, the jigs 40 are easily damaged, resulting in an extremely short service life of the jigs 40.

There has been a further problem in that, if an insulating varnish is applied to the joint portions 56 and 57, then the varnish tends to be applied over the adjacent joint portions 56 and 57, clogging a passage of cooling air with consequent noises or deteriorated ability of cooling the stator winding assembly 16.

SUMMARY OF THE INVENTION

Accordingly, the present invention has been made with a view toward solving the problems described above, and it is an object thereof to provide an alternator capable of preventing a short circuit at a coil end, providing improved ability of cooling a stator winding, and reducing noises.

According to one aspect of the present invention, there is provided an alternator including a multi-phase stator winding assembly installed in a plurality of slots which extend in an axial direction of the stator core and are arranged at predetermined pitches in a circumferential direction, the multi-phase stator winding assembly comprising a coil end outside the slot on an end surface the of the stator core, the coil end having a plurality of joint portions where a distal end extending in an axial direction of a first conductor portion drawn out from an n-th layer in a slot and a distal end extending in an axial direction of a second conductor portion drawn out from an (n+1)th layer in a slot located a predetermined number of slots apart in a circumferential direction are connected, the joint portions being disposed in a plurality of rows in the circumferential direction, wherein the joint portions disposed in a radial direction are individually shifted in the circumferential direction.

In a preferred form of the alternator according to the present invention, an outer joint portion wherein a distal end of a first conductor portion extending from a first layer of a first slot and a distal end of a second conductor portion extending from a second layer in a second slot are connected, and an inner joint portion wherein a distal end of a first conductor portion extending from a third layer of the first slot and a distal end of a second conductor portion extending from a fourth layer in the second slot are connected are apart from each other by half a slot.

In an alternator according to another aspect of the present invention, a distance between an inner joint portion located on an inner peripheral side of a stator core and an end surface of the stator core is different from a distance between an outer joint portion located on an outer peripheral side of the stator core and the end surface of the stator core.

In a preferred form of the alternator in accordance with the present invention, the distal end of the first conductor portion and the distal end of the second conductor portion overlap in the radial direction to form the joint portion.

In another preferred form of the alternator, the joint portion is inclined from a diametrical line of the stator in a direction of rotation of a rotor, and the joint portion guides cooling air, which is generated by the rotation of the rotor, out of the stator core.

In still another preferred form of the alternator, there is a gap in the radial direction between an inner joint portion located on an inner peripheral side of the stator core and an outer joint portion located on an outer peripheral side of the stator core.

In yet another preferred form of the alternator, the first conductor portion and the second conductor portion form a substantially U-shaped conductor segment having leg ends bending away from each other, and the joint portions are formed by joining the leg ends by welding.

In a further preferred form of the alternator, the joint portions are coated with an insulating resin.

In a further preferred form of the alternator, the first conductor portion and the second conductor portion are formed of a continuous conductor, and are continuously connected in the joint portions.

DESCRIPTION OF THE PREFERRED EMBODIMENTS

Figure 1:
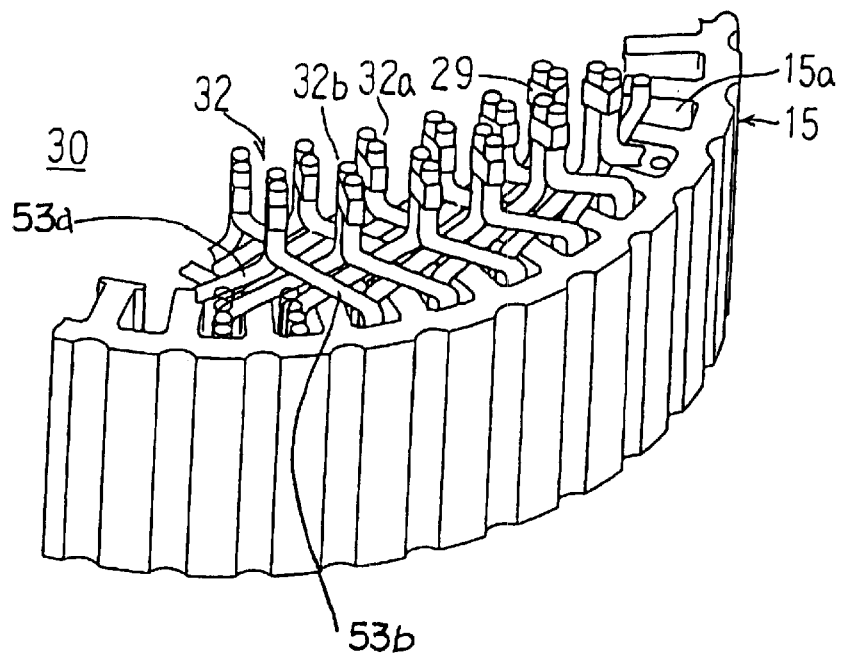
FIG. 1 is a perspective view showing an essential section of a stator of an automotive alternator according to First Embodiment of the present invention.

Embodiments of the present invention will now be described. In the following description, components that are the identical or equivalent to those of a conventional art will be assigned the same reference numerals.

First Embodiment

Figure 2:
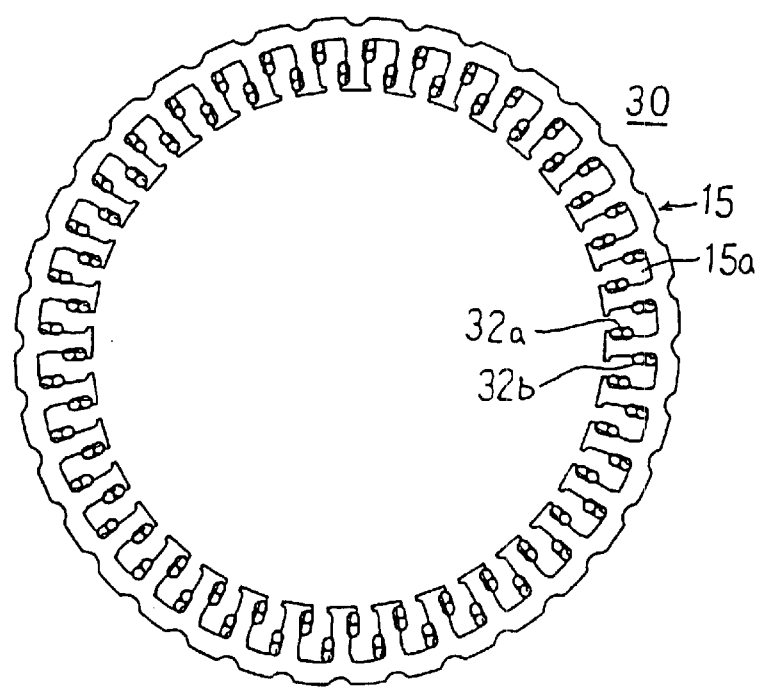
FIG. 2 is a top plan view showing a stator core and joint portions, which view is obtained by observing the stator of FIG. 1 from the joint portions.
Figure 3:
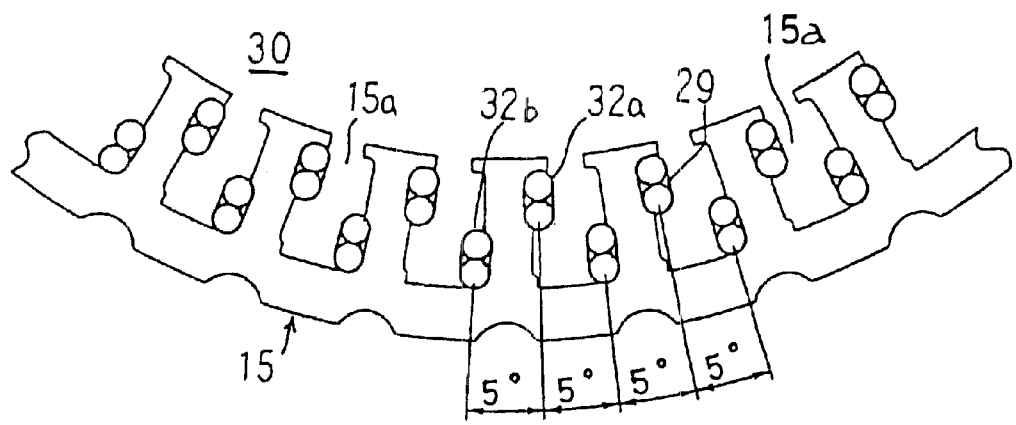
FIG. 3 is an enlarged view of an essential section of the stator core and the joint portions of FIG. 2.
Figure 4:
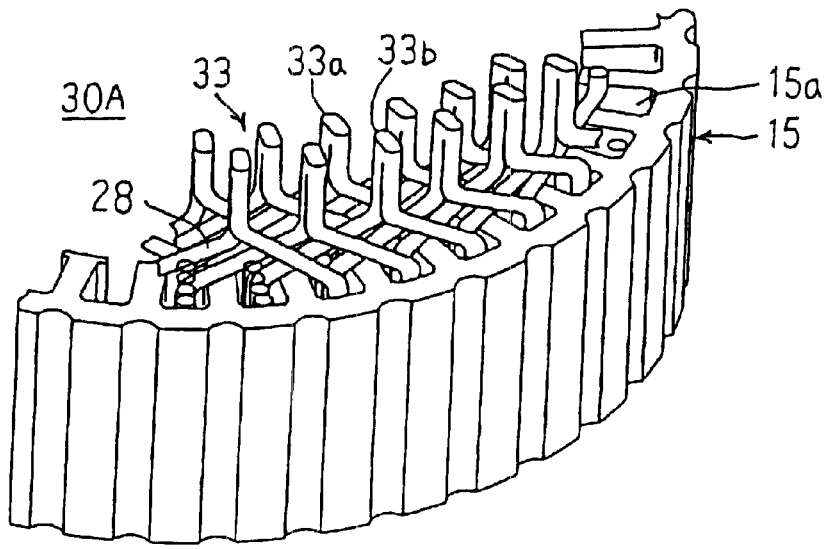
FIG. 4 is a perspective view showing an essential section of a stator of an automotive alternator according to Second Embodiment of the present invention.

FIG. 1 is a perspective view showing an essential section of a stator 30 of an automotive alternator according to First Embodiment of the present invention; FIG. 2 is a top plan view showing a stator core and joint portions, in which the stator 30 of FIG. 1 is observed from a front bracket 1 side (joint portion side); and FIG. 3 is an enlarged view of an essential section of the stator core and the joint portions shown in FIG. 2.

Referring to FIG. 1, a stator core 15 is shaped like a cylinder and has thirty-six slots 15a which have axes oriented in directions of grooves and are formed at equiangular pitches in a circumferential direction such that the slots 15a open on an inner peripheral side.

Figure 16:
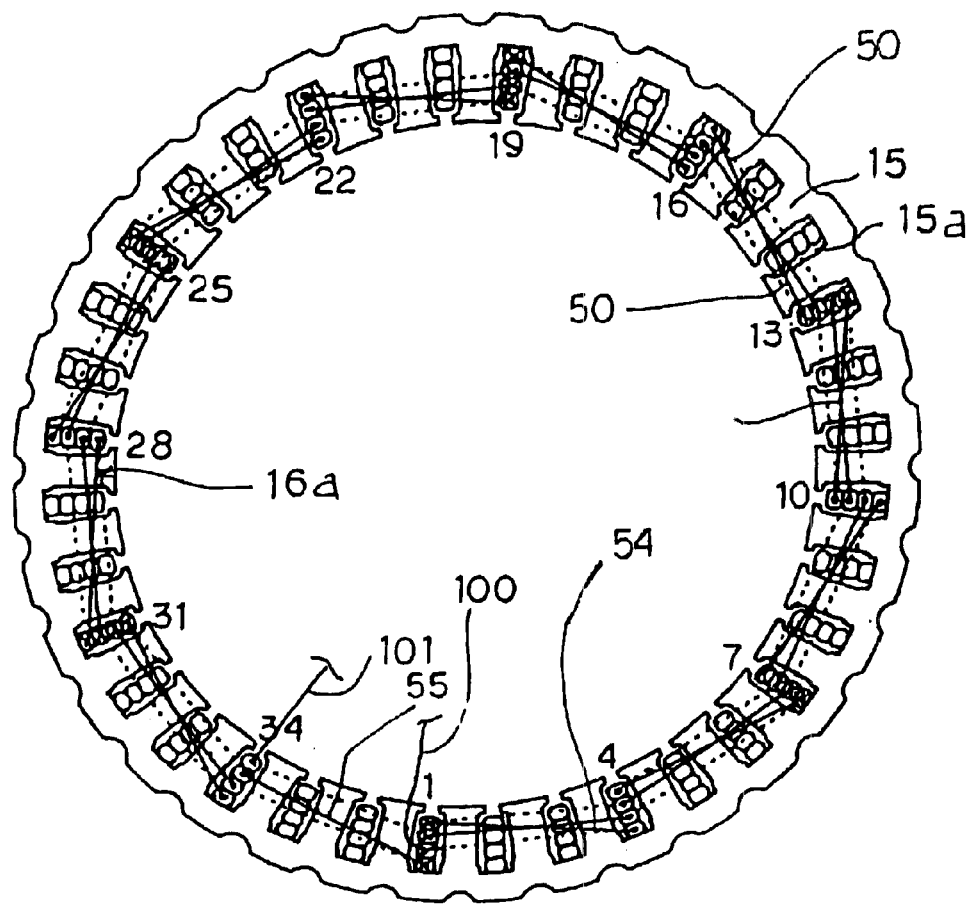
FIG. 16 is a winding diagram of the automotive alternator of FIG. 15.

A stator winding assembly 32 is constructed by a plurality of conductor segments 50 made of copper wires which are provided with insulating coating and virtually formed into U shapes, and installed in each slot 15a of the stator core 15 as shown in a winding diagram of FIG. 16.

In the conductor segment 50 which is the first conductor and the second conductor as shown in FIG. 16, for example, a connecting portion 53a extending to the front bracket 1 side from address 2 in the slot 15a of slot number 19 is slightly longer than a connecting portion 53b extending to the front bracket 1 side from address 1 in the slot 15a of slot number 22, which is three slots apart. Likewise, a connecting portion 53a extending to the front bracket 1 side from address 4 in the slot 15a of slot number 19 is slightly shorter than a connecting portion 53b extending to the front bracket 1 side from address 3 in the slot 15a of slot number 22.

Thus, the right and left connecting portions 53a and 53b of the U-shaped conductor segment 50 are formed to have different lengths so as to achieve a structure wherein an inner joint portion 32a and an outer joint portion 32b having distal ends of the connecting portions 53a and 53b joined by soldering are disposed such that they are shifted by half a slot in a circumferential direction as shown in FIG. 2 and FIG. 3. In this embodiment, there are thirty-six slots 15a, which are disposed at intervals of 10 degrees. The inner joint portion 32a and the outer joint portion 32b are shifted by 5 degrees, which is half the angle of the interval between the slots 15a.

Figure 17:
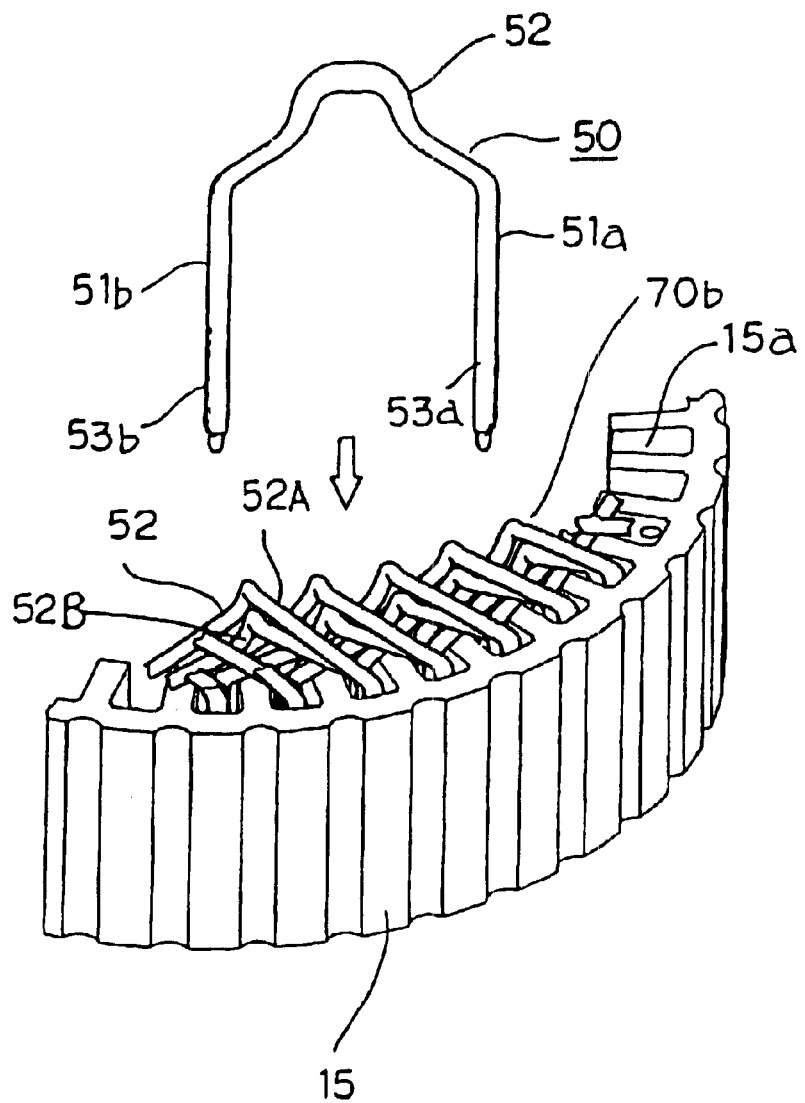
FIG. 17 is a perspective view of an essential section, which view is obtained by observing a stator of FIG. 15 from a rear bracket side.
Figure 18:
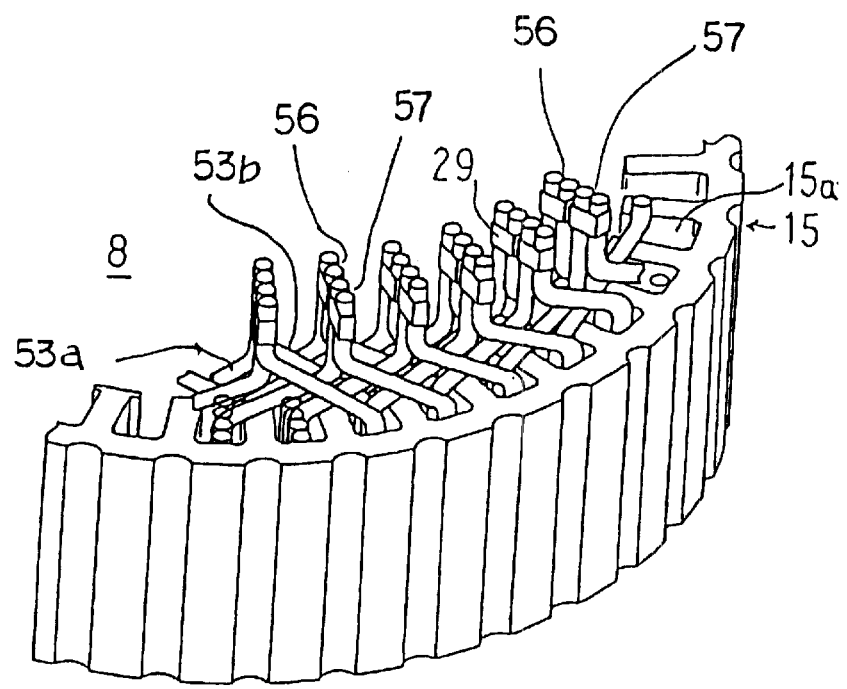
FIG. 18 is a perspective view of an essential section, which view is obtained by observing a stator of FIG. 15 from a front bracket side.
Figure 19:
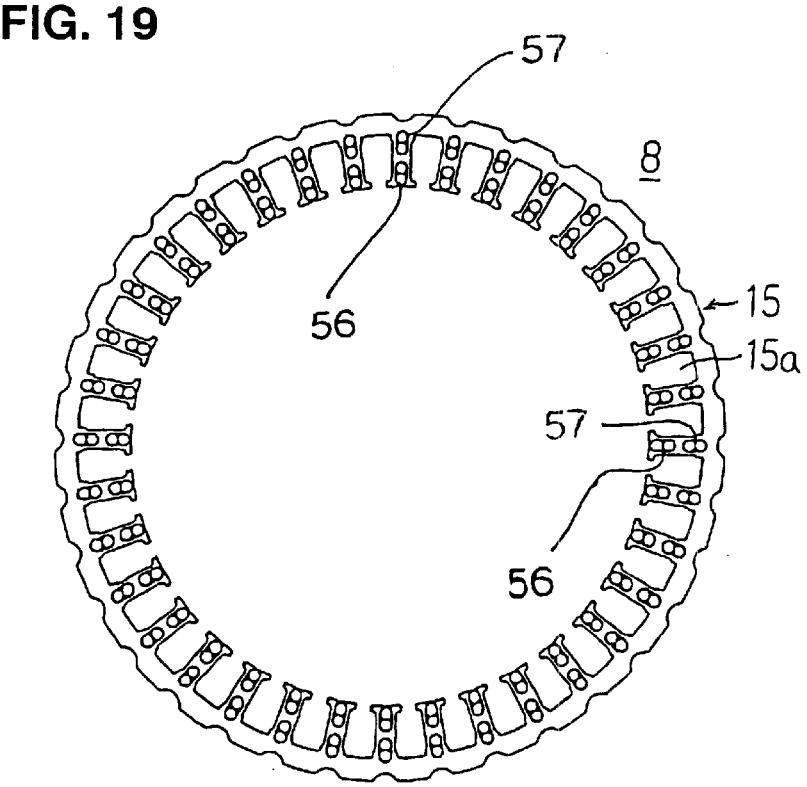
FIG. 19 is a top plan view showing joint portions and a stator core, which view is obtained by observing the stator of FIG. 15 from the front bracket side.

In the automotive alternator having the above construction, first, the connecting portions 53a and 53b of each conductor segment 50 are inserted in predetermined slots 15a from the rear bracket 2 side until they project toward the front bracket 1 as shown in FIG. 17. Thereafter, the connecting portions 53a and 53b are bent so that they are apart from each other in the circumferential direction, then the distal ends thereof are overlapped in the radial direction. At this time, the distal ends of the connecting portions 53a and 53b on the inner peripheral side of the conductor segment 50 and the distal ends of the connecting portions 53a and 53b on the outer peripheral side of the conductor segment 50 are shifted by half a slot in the circumferential direction. The distal ends are then wrapped with clamps 29 to be secured, and welded by soldering so as to form the inner joint portion 32a and the outer joint portion 32b.

According to First Embodiment, the inner joint portion 32a and the outer joint portion 32b are shifted by half a slot in the circumferential direction, so that they are disposed without overlapping each other in the radial direction. With this arrangement, wrapping the clamps 29 can be easily wrapped around the connecting portions 53a and 53b, and chances for solder to undesirably cover adjacent joint portions 32a and 32b are minimized, thus permitting greater ease of connecting work and a higher yield.

Furthermore, cooling air discharged from a centrifugal fan 5 more easily hits the connecting portions 53a and 53b of the conductor segments 50 on the outer peripheral side, leading to improved ability of cooling the stator winding assembly 32.

The inventor of the application concerned has replaced a conventional stator 8 by the stator 30 of First Embodiment and actuated the automotive alternator to measure a temperature of the stator 30. The temperature of the stator 30 is about 10° C. lower than that of the conventional stator 8, and the solder of the joint portions 32a and 32b did not drip from melting.

In addition, since the inner joint portion 32a and the outer joint portion 32b are sufficiently apart, it has been possible to avoid an inconvenience in which the joint portions 32a and 32b come in contact due to vibrations with consequent occurrence of a short circuit.

Second Embodiment

In First Embodiment set forth above, the distal ends of the conductor segments 50 are joined by soldering. In Second Embodiment, the distal ends of the conductor segments 50 are joined by soldering, and insulating varnish is further applied to the surfaces thereof to form an inner joint portion 33a and an outer joint portion 33b. The rest of the construction is the same as the construction of First Embodiment.

A stator 30B according to Second Embodiment is able to provide the same advantages as those of First Embodiment. Moreover, the insulating varnish does not cover an adjacent inner joint portion 33a or outer joint portion 33b, preventing the insulating varnish from clogging a passage of cooling air, which clogging produces noises or adversely affects cooling of a stator winding assembly 33.

Third Embodiment

Figure 5:
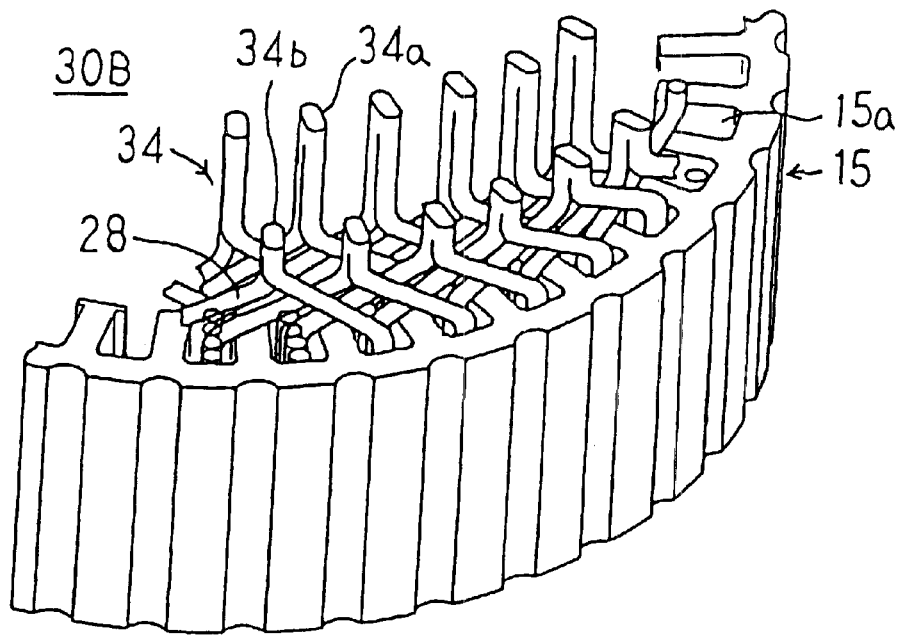
FIG. 5 is a perspective view showing an essential section of a stator of an automotive alternator according to Third Embodiment of the present invention.

In a stator 30B of Third Embodiment, a height of an inner joint portion 34a in an axial direction is set to be larger than that of an outer joint portion 34b as shown in FIG. 5. The rest of the construction is the same as the construction of Second Embodiment described above.

In the stator 30B according to Third Embodiment, a distance between the inner joint portion 34a and the outer joint portion 34b of a stator winding assembly 34 can be further increased; therefore, greater ease of welding and a higher yield can be improved, and a short circuit between the joint portions 34a and 34b attributable to vibration can be prevented.

Fourth Embodiment

Figure 6:
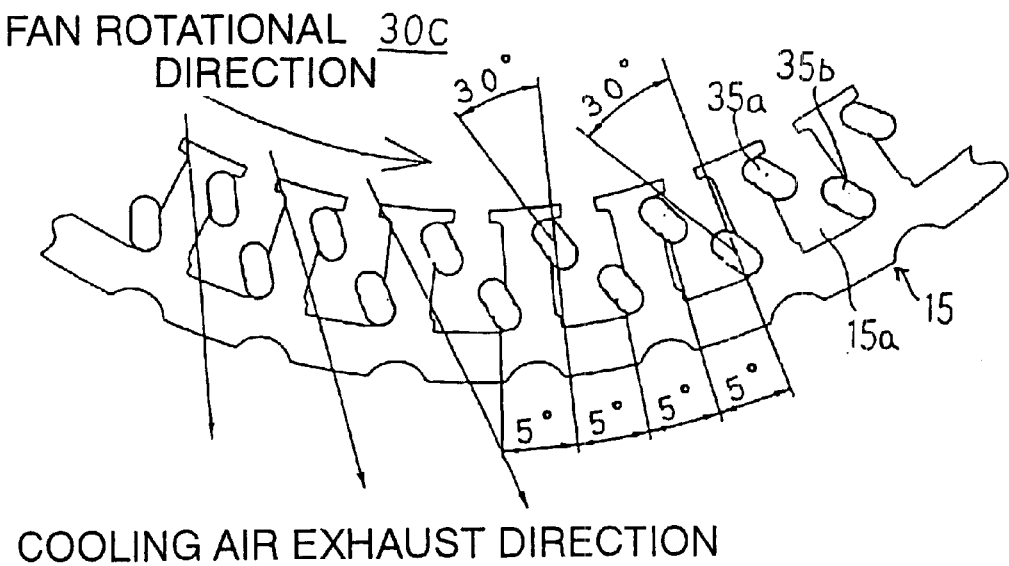
FIG. 6 is a top plan view showing a stator core and joint portions, which view is obtained by observing a stator of an automotive alternator according to Fourth Embodiment of the present invention from the joint portions.

In a stator 30C of Fourth Embodiment, an inner joint portion 35a and an outer joint portion 35b are provided so that they incline in a direction of rotation of a rotor 7 with respect to a radial direction as shown in FIG. 6. In this embodiment, the inner joint portion 35a and the outer joint portion 35b are slanted 30 degrees with respect to a radial line passing an axial center of a stator winding assembly 15. The rest of the construction of Fourth Embodiment is the same as the construction of Second Embodiment described above.

In the stator 30C according to Fourth Embodiment, the inclinations of the joint portions 35a and 35b substantially agree with a direction in which cooling air from a centrifugal fan 5 is discharged, permitting smooth exhaust of the cooling air.

The inventor of the application concerted has replaced a conventional stator 8 by the stator 30C of Fourth Embodiment, and operated an automotive alternator under a condition wherein a rotor 7 rotates at 10000 rpm to measure wind noises. A reduction of 5 dB in noise level has been achieved as compared with the conventional stator.

In the embodiments set forth above, the joint portions are formed by solder welding. Obviously, however, the forming method of the joint portions is not limited thereto; the joint portions may be formed by TIG welding.

Figure 7:
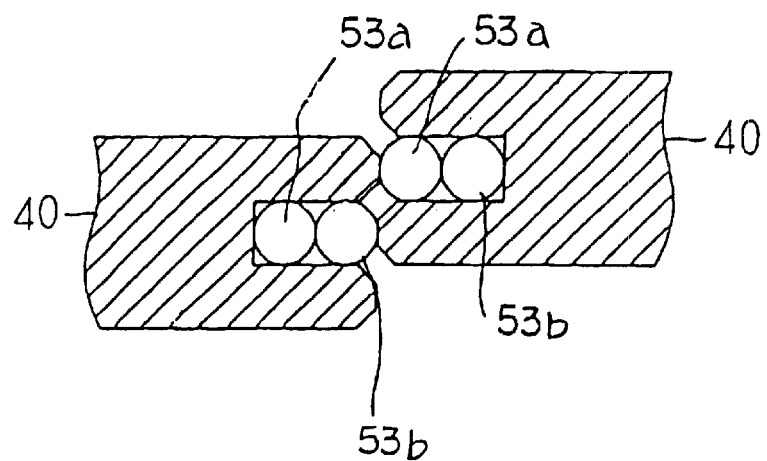
FIG. 7 is an explanatory diagram of joint portions formed by TIG welding.
Figure 8:
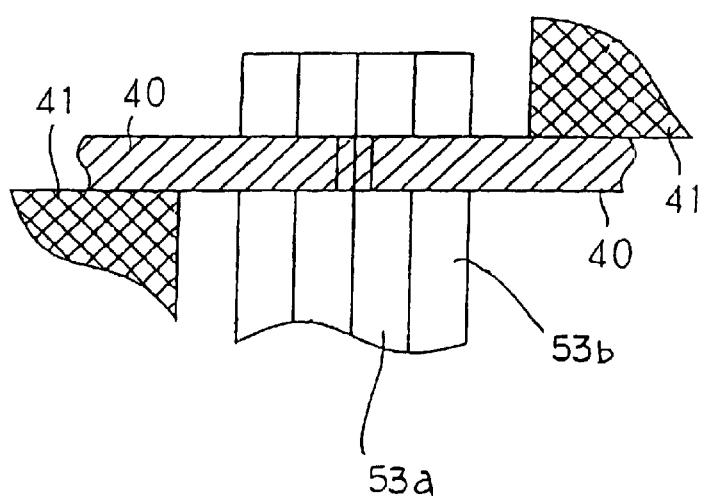
FIG. 8 is a side sectional view of the joint portions of FIG. 7.

In the example, as shown in FIG. 7 and FIG. 8, distal ends of connecting portions 53a and 53b overlapped in a radial direction are held by a pair of clamping jigs 40, and the distal ends of the connecting portions 53a and 53b are connected by TIG welding.

At this time, the distal end of one clamping jig 40 pushes the connecting portions 53a and 53b of conductor segments 50 overlapped in a radial direction in the other clamping jig 40. Hence, the connecting portions 53a and 53b are securely held, permitting stable welding work.

Furthermore, an area of contact between the connecting portions 53a and 53b and the clamping jigs 40 is increased, allowing heat during welding to be transmitted to heat radiating jigs 41 via the clamping jigs 40 for quick heat radiation. This prevents occurrence of burning of coating in the vicinity of a joint portion of the connecting portions 53a and 53b during welding, allowing a good welding condition at the joint portion.

Figure 20:
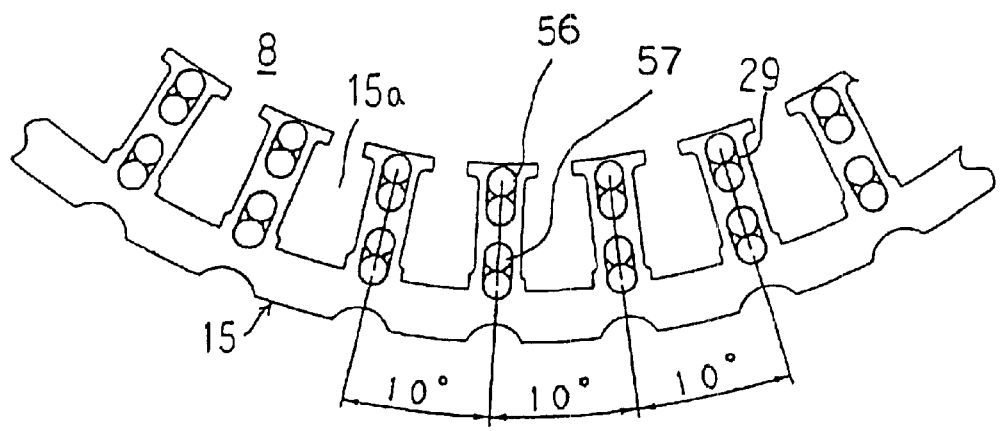
FIG. 20 is an enlarged view of an essential section of the joint portions and the stator core of FIG. 19.
Figure 21:
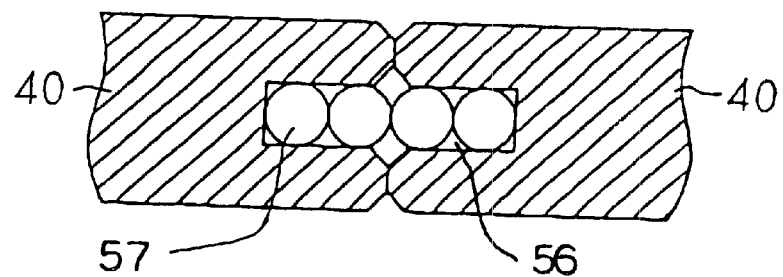
FIG. 21 is an explanatory diagram of a joint portion formed by TIG welding.
Figure 22:
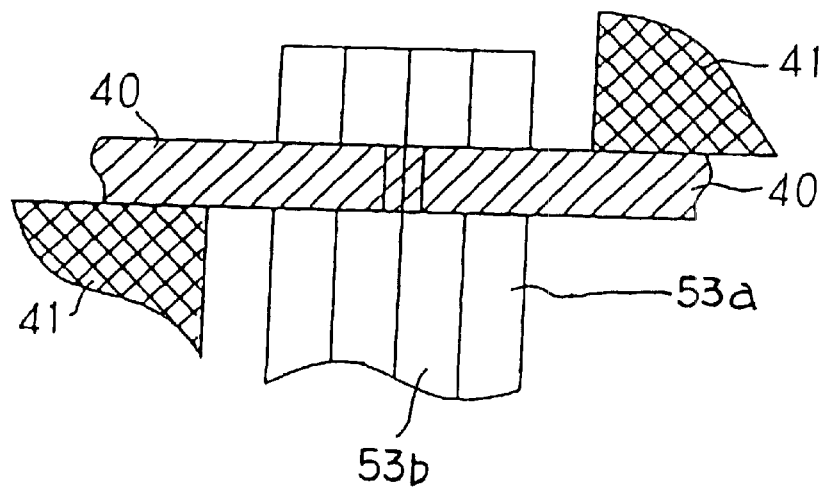
FIG. 22 is a side sectional view of the joint portion of FIG. 21.

Moreover, as compared with the conventional jigs shown in FIG. 20 and FIG. 21 wherein tapered distal ends of the clamping jigs 40 are abutted against each other, copper jigs 40 are more resistant to damage. According to results of experiments performed by the inventor of the application concerned, a service life of the clamping jigs 40 is prolonged by about ten times.

Fifth Embodiment

Figure 9:
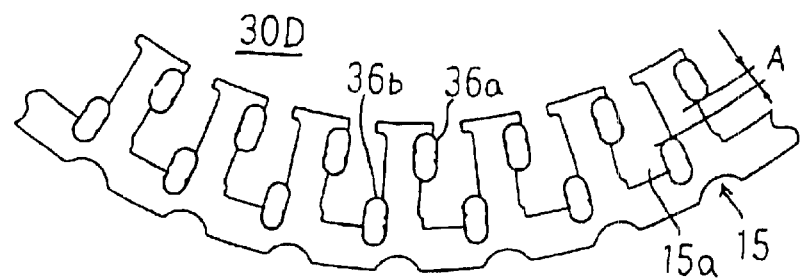
FIG. 9 is a top plan view showing a stator core and joint portions, which view is obtained by observing a stator of an automotive alternator according to Fifth Embodiment of the present invention from the joint portions.

In a stator 30D of Fifth Embodiment, as illustrated in FIG. 9, an inner joint portion 36a and an outer joint portion 36b are disposed so that they are shifted by half a slot in a circumferential direction and have a gap A in a radial direction. The rest of the construction is identical to the construction of Second Embodiment described above.

In Fifth Embodiment, a larger gap can be secured between the inner joint portion 36a and the outer joint portion 36b as compared with Second Embodiment. This prevents adjacent joint portions 36a and 36b from being involved during TIG welding, permitting further greater ease of welding work and a still higher yield.

Figure 10:
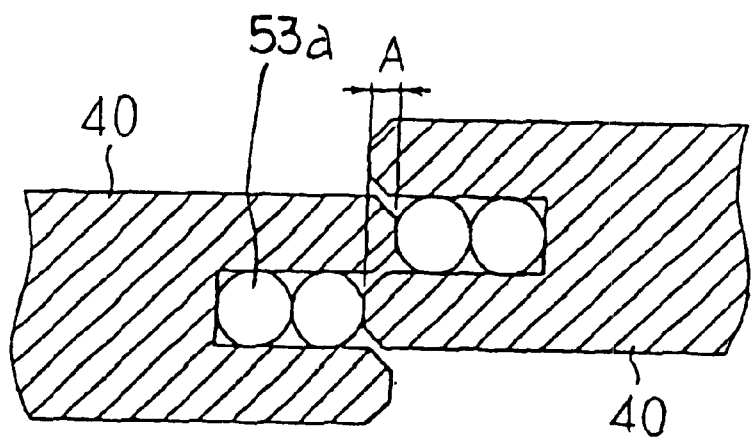
FIG. 10 is an explanatory diagram of a joint portion of FIG. 9 that is formed by TIG welding.
Figure 11:
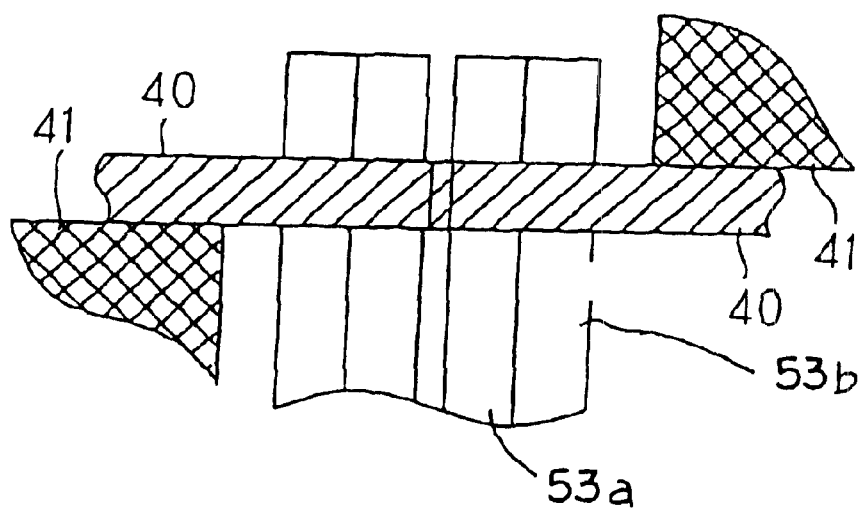
FIG. 11 is a side sectional view of the joint portions of FIG. 10.

In Fifth Embodiment also, as illustrated in FIG. 10 and FIG. 11, distal ends of connecting portions 53a and 53b overlapped in a radial direction are held by a pair of clamping jigs 40 with the gap A maintained, and the distal ends of the connecting portions 53a and 53b are connected by TIG welding.

At this time, the distal end of one clamping jig 40 pushes the connecting portions 53a and 53b of conductor segments 50 overlapped in a radial direction in the other clamping jig 40. Hence, the connecting portions 53a and 53b are securely held, permitting stable TIG welding work.

Sixth Embodiment

Figure 12:
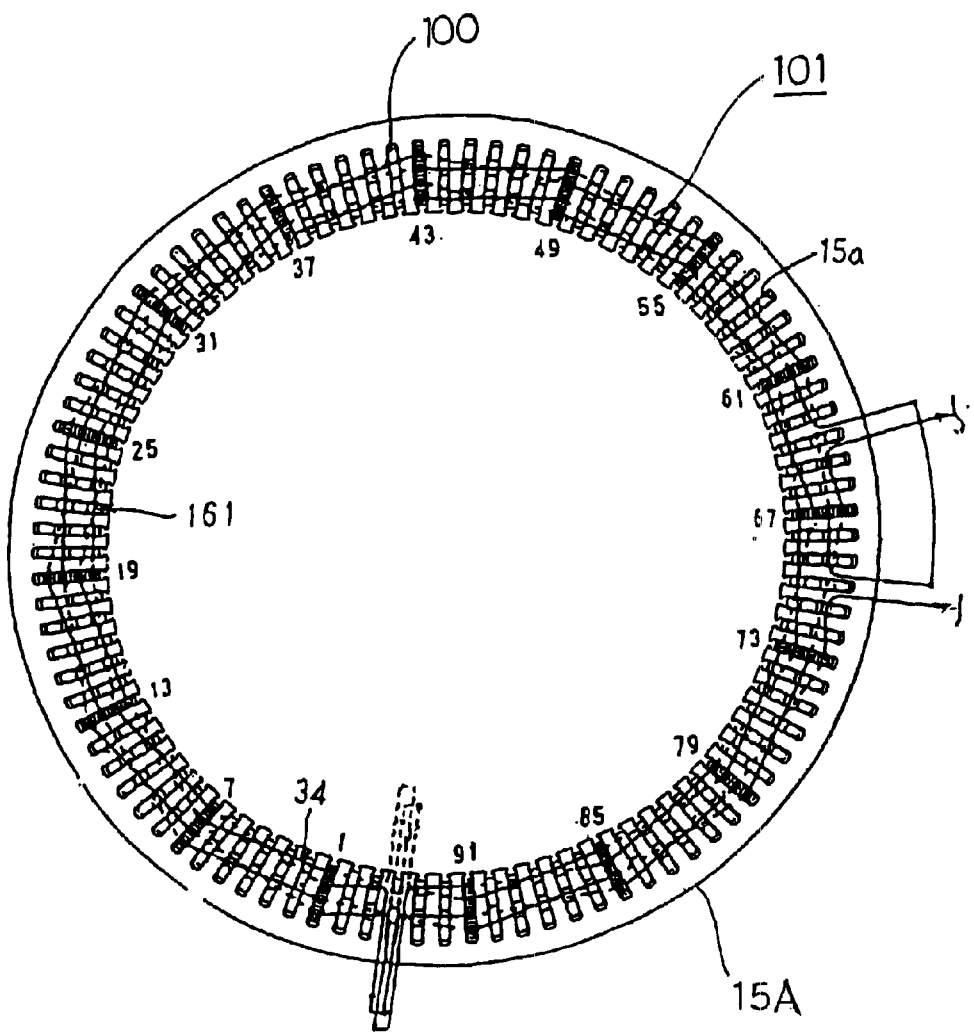
FIG. 12 is a winding diagram of an automotive alternator according to Sixth Embodiment of the present invention.

FIG. 12 is a winding diagram of a stator 30E of an automotive alternator according to Sixth Embodiment of the present invention.

FIG. 12 is the winding diagram of an a-phase stator winding member 161, and it does not show winding diagrams of a b-phase stator winding member and a c-phase stator winding member. In the diagram, solid lines denote conductors 100 connected to a rear bracket 2, and dotted lines denote conductors 100 connected to the front bracket 1.

The stator winding members 161 for six phases are formed by shifting slots 15a, in which the conductors 100 are installed, by one slot, and the stator winding members 161 are star-connected for every three phases, thereby forming two sets of three-phase stator winding assemblies.

A stator core 15A of the stator 30E is provided with 96 slots 15a equidistantly formed to accommodate the two sets of three-phase stator winding assemblies, corresponding to a number (16) of magnetic poles of a rotor 7. A stator winding assembly 101 is constituted by a plurality of winding members 161 wherein one conductor 100 is bent back outside a slot 15a on an end surface side of the stator core 15A and wave-wound such that it alternately passes an inner layer and an outer layer in a direction of slot depth in the slot 15a for every six slots.

More specifically, the conductor 100 led out to the front bracket 1 side from a first layer in each slot 15a is led into a second layer in the slot 15a located six slots away, and led out to the rear bracket 2 side, then led into the first layer in the slot 15a located another six slots away. Furthermore, the conductor 100 led out to the front bracket 1 side from a fourth layer is led into a third layer in the slot 15a located six slots away, and led out to the rear bracket 2 side, then led into the fourth layer in the slot 15a located another six slots away. The conductor 100 is formed of a copper wire provided with insulation coating.

Figure 13:
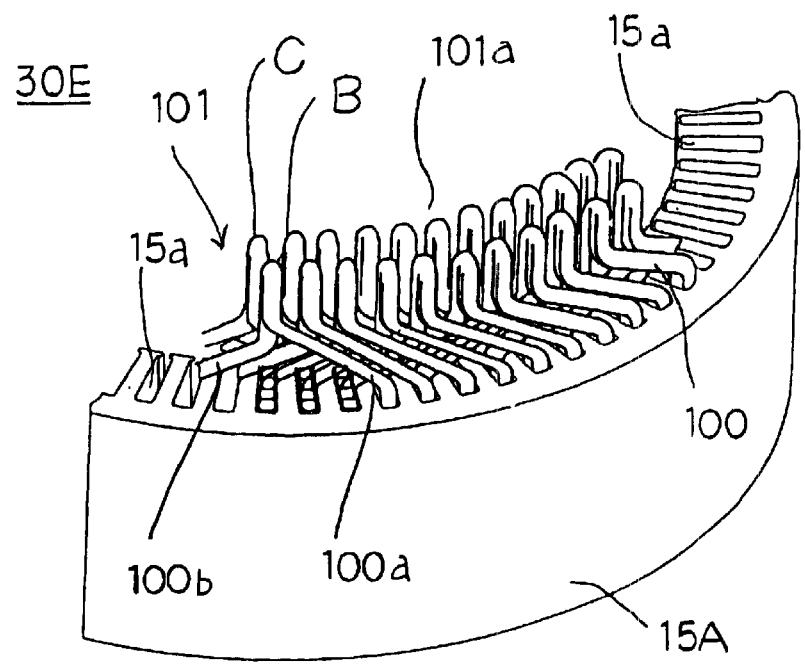
FIG. 13 is a perspective view showing an essential section of a stator of FIG. 12.

FIG. 13 is a perspective view of an essential section of the stator 30E of FIG. 12 observed from the front bracket 1. A distal end B that extends in an axial direction of a first conductor portion 100a drawn out from the first layer in the slot 15a is continuously connected to the distal end B that extends in an axial direction of a second conductor portion 100b drawn out from the second layer in the slot 15a located six slots apart in a circumferential direction, the first and second conductor portions being formed of the continuous conductor 100. Likewise, a distal end C that extends in an axial direction of the first conductor portion 100a drawn out from a third layer in the slot 15a is continuously connected to the distal end C that extends in an axial direction of a second conductor portion 100b drawn out from a fourth layer in the slot 15a located six slots apart in the circumferential direction, the first and second conductor portions being formed of the continuous conductor 100. The distal ends B and C are apart from each other by half the slot 15a in the circumferential direction.

In Sixth Embodiment, the distal ends B and C also serving as joint portions are apart from each other by half the slot 15a in the circumferential direction, not overlapping in the radial direction. Therefore, cooling air discharged from a fan 5 smoothly passes a coil end 101a of the stator winding assembly 101, so that the stator 30E is efficiently cooled to suppress a rise in temperature of the stator 30E.

Seventh Embodiment

Figure 14:
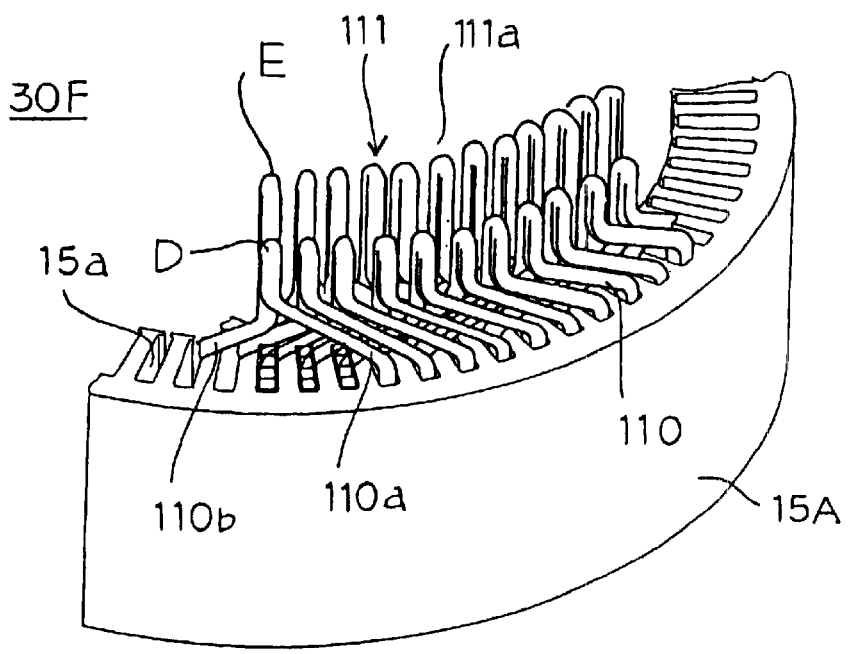
FIG. 14 is a perspective view showing an essential section of a stator of an automotive alternator according to Seventh Embodiment of the present invention.
Figure 15:
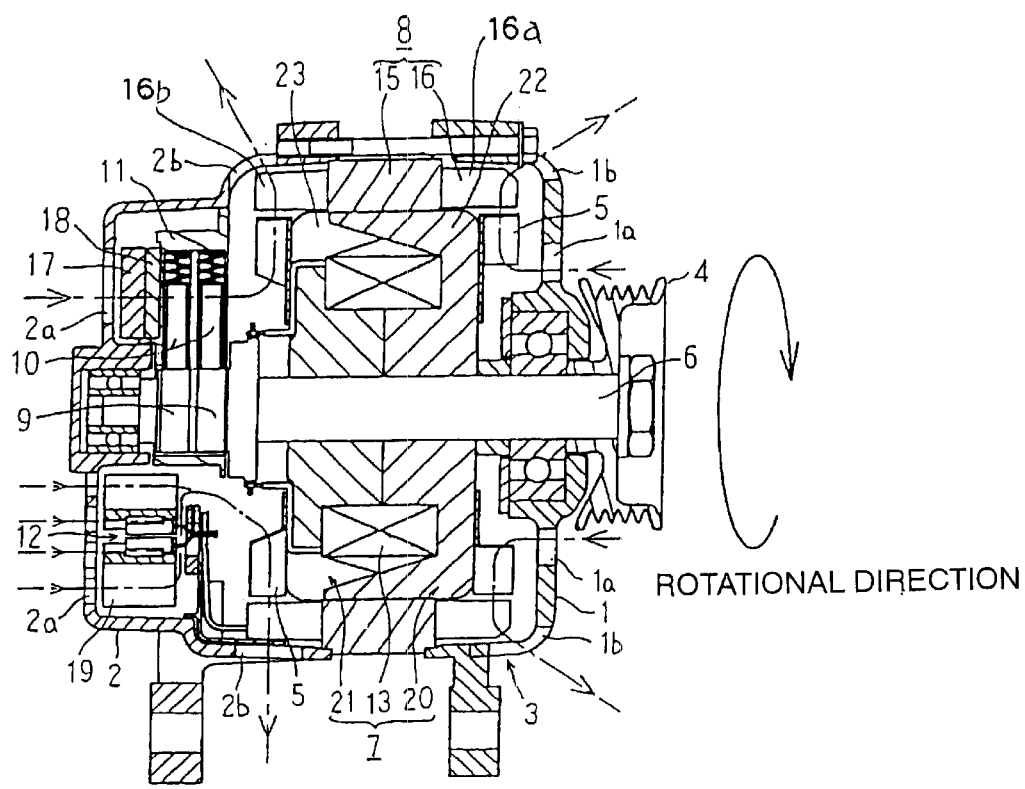
FIG. 15 is a sectional view of a conventional automotive alternator.

FIG. 14 is a perspective view of an essential section of a stator 30F (observed from a front bracket 1) of Seventh Embodiment in accordance with the present invention. A distal end D that extends in an axial direction of a first conductor portion 110a drawn out from a first layer in a slot 15a is continuously connected to the distal end D that extends in an axial direction of a second conductor portion 110b drawn out from a second layer in the slot 15a located six slots apart in a circumferential direction, the first and second conductor portions being formed of a continuous conductor 110. Likewise, a distal end E that extends in an axial direction of the first conductor portion 110a drawn out from a third layer in the slot 15a is continuously connected to the distal end E that extends in an axial direction of the second conductor portion 110b drawn out from a fourth layer in the slot 15a located six slots apart in a circumferential direction, the two conductors being formed of the continuous conductor 110. The distal ends D and E are apart from each other by half the slot 15a in the circumferential direction, and the distal ends E on an inner peripheral side are higher than the distal ends D on an outer peripheral side.

In Seventh Embodiment, the distal ends D and E also serving as joint portions are apart from each other by half the slot 15a in the circumferential direction. Therefore, cooling air discharged from a fan 5 smoothly passes a coil end 111a of the stator winding assembly 111, so that the stator 30F is efficiently cooled to suppress a rise in temperature of the stator 30F.

Moreover, since the distal ends E on the inner peripheral side are higher than the distal ends D on the outer peripheral, a more distance is provided between the distal ends D and the distal ends E, making it possible to suppress occurrence of a short circuit caused by vibrations.

In the above descriptions of the stator winding assemblies of the embodiments, the 4-turn three-phase stator winding assemblies have been referred to. The number of turns, however, may be increased to, for example, six or eight if a higher output at a lower speed is required.

As described above, in an alternator according to one aspect of the present invention, there is provided an alternator including a multi-phase stator winding assembly installed in a plurality of slots which extend in an axial direction of the stator core and are arranged at predetermined pitches in a circumferential direction, the multi-phase stator winding assembly comprising a coil end outside the slot on an end surface the of the stator core, the coil end having a plurality of joint portions where a distal end extending in an axial direction of a first conductor portion drawn out from an n-th layer in a slot and a distal end extending in an axial direction of a second conductor portion drawn out from an (n+1)th layer in a slot located a predetermined number of slots apart in a circumferential direction are connected, the joint portions being disposed in a plurality of rows in the circumferential direction, wherein the joint portions disposed in a radial direction are individually shifted in the circumferential direction. Therefore, a gap is surely secured between the joint portions adjoining in the circumferential direction and also between the joint portions adjoining in the radial direction. With this arrangement, greater ease of connecting work and a higher yield can be achieved when the connecting work is performed by, for example, welding.

Furthermore, the cooling air generated by rotation of the rotor smoothly passes the coil end of the stator winding assembly. Hence, the stator is efficiently cooled, suppressing a rise in the temperature of the stator.

According to one form of the alternator, an outer joint portion where a distal end of a first conductor portion extending from a first layer of a first slot and a distal end of a second conductor portion extending from a second layer in a second slot are connected, and an inner joint portion where a distal end of a first conductor portion extending from a third layer of the first slot and a distal end of a second conductor portion extending from a fourth layer in the second slot are connected may bee spaced apart from each other by half a slot. Therefore, the joint portions on the inner peripheral side and the joint portions on the outer peripheral side are alternately disposed at equal intervals in the circumferential direction. With this arrangement, when the connecting work is performed by, for example, welding, greater ease of connecting work and a higher yield can be achieved. Moreover, the cooling air generated by the rotation of the rotor evenly passes the coil end of the stator winding assembly, so that the stator is cooled efficiently and evenly, and a rise in the temperature of the stator will be evenly suppressed.

According to the alternator of the present invention, a distance between an inner joint portion located on an inner peripheral side of the stator core and an end surface of the stator core is different from a distance between an outer joint portion located on an outer peripheral side of the stator core and the end surface of the stator core. Therefore, a larger gap can be secured between the outer joint portions and the inner joint portions. Hence, when the connecting work is performed by welding, the ease of welding work and the yield can be improved and the occurrence of a short circuit attributable to vibration can be suppressed.

According to another form of the alternator, the distal end of the first conductor portion and the distal end of the second conductor portion may overlap in the radial direction to form the joint portion. Therefore, the circumferential widths of the joint portions are small, so that larger gaps are provided between the joint portions adjoining in the circumferential direction. This arrangement increases the passing area of the cooling air generated by the rotation of the rotor, enabling the stator to be efficiently cooled.

According to still another form of the alternator, the joint portion may be inclined from a diameter of the stator in a direction of rotation of the rotor, and the joint portion may guide cooling air, which is generated by the rotation of the rotor, out of the stator core. Therefore, the alternator of this form allows the cooling air generated by the rotation of the rotor to be smoothly exhausted out of the stator, the stator can be efficiently cooled, and wind noises can be reduced.

According to still another form of the alternator, a gap may be provided in the radial direction between an inner joint portion located on an inner peripheral side of the stator core and an outer joint portion located on an outer peripheral side of the stator core. Therefore, the alternator of this form allows a larger radial gap to be secured between the outer joint portions and the inner portions. Hence, when the connecting work is performed by, for example, welding, greater ease of connection work and a higher yield can be achieved, and the occurrence of a short circuit attributable to vibration can be suppressed.

According to still another form of the alternator, the first conductor portion and the second conductor portion may form a substantially U-shaped conductor segment having leg ends bending away from each other, and the joint portions may be formed by joining the leg ends by welding. Therefore, the alternator of this form invention makes it possible to easily and securely connect the distal end extending in the axial direction of the first conductor portion drawn out from an n-th layer in a slot, to the distal end extending in the axial direction of the second conductor portion drawn out from an (n+1)th layer in a slot that is apart by a predetermined number of slots in the circumferential direction.

According to still another form of the alternator, the joint portion may be coated with an insulating resin. Therefore, the alternator of this form secures insulation of the joint portions and exhibits improved corrosion resistance to brine, etc.

According to still another form of the alternator, the first conductor portion and the second conductor portion may be formed of a continuous conductor, and be continuously connected in the joint portion. Therefore, the alternator of this form obviates the need for welding or other similar work for the joint portions, permitting easy fabrication of the stator winding assembly.

What is claimed is:

1. An alternator comprising:

a rotor alternately forming a north (N) pole and a south (S) pole in a direction of rotation thereof;

a stator core surrounding the rotor; and a multi-phase stator winding assembly installed in a plurality of slots which extend in an axial direction of the stator core and are arranged at predetermined pitches in a circumferential direction, said multi-phase stator winding assembly comprising a coil end outside the slot on an end surface side of the said stator core, said coil end having a plurality of joint portions where a distal end extending in an axial direction of a first conductor portion drawn out from an n-th layer in a slot and a distal end extending in an axial direction of a second conductor portion drawn out from an (n+1)th layer in a slot located a predetermined number of slots apart in a circumferential direction are connected, said joint portions being disposed in a plurality of rows in the circumferential direction, wherein said joint portions disposed in a radial direction are individually shifted in the circumferential direction.

2. An alternator according to claim 1, wherein an outer joint portion where a distal end of a first conductor portion extending from a first layer of a first slot and a distal end of a second conductor portion extending from a second layer in a second slot are connected, and an inner joint portion where a distal end of a first conductor portion extending from a third layer of said first slot and a distal end of a second conductor portion extending from a fourth layer in said second slot are connected, are spaced apart from each other by half a slot.

3. An alternator according to claim 1, wherein a distance between an inner joint portion located on an inner peripheral side of said stator core and an end surface of said stator core is different from a distance between an outer joint portion located on an outer peripheral side of said stator core and the end surface of said stator core.

4. An alternator according to claim 1, wherein the distal end of the first conductor portion and the distal end of the second conductor portion overlap in the radial direction to form said joint portion.

5. An alternator according to claim 1, wherein said joint portion is inclined from a diameter of said stator in a direction of rotation of said rotor, and said joint portion guides cooling air, which is generated by the rotation.

6. An alternator according to claim 1, wherein a gap is provided in the radial direction between an inner joint portion located on an inner peripheral side of said stator core and an outer joint portion located on an outer peripheral side of said stator core.

7. An alternator according to claim 1, wherein said first conductor portion and said second conductor portion form a substantially U-shaped conductor segment having leg ends bending away from each other, and said joint portions are formed by joining the leg ends by welding.

8. An alternator according to claim 1, wherein said joint portion is coated with an insulating resin.

9. An alternator according to claim 1, wherein said first conductor portion and said second conductor portion are formed of a continuous conductor, and are continuously connected in said joint portion.

10. An alternator comprising:

rotor alternately forming a north (N) pole and a south (S) pole in a direction of rotation thereof;

a stator core surrounding the rotor; and a multi-phase stator winding assembly installed in a plurality of slots which extend in an axial direction of said stator core and are arranged at predetermined pitches in a circumferential direction, said multi-phase stator winding assembly comprising a coil end outside said slot on an end surface side of said stator core, said coil end having a plurality of joint portions where a distal end extending in an axial direction of a first conductor portion drawn out from an n-th layer in a slot and a distal end extending in an axial direction of a second conductor portion drawn out from an (n+1)th layer in a slot located a predetermined number of slots apart in a circumferential direction are connected, said joint portions being disposed in a plurality of rows in the circumferential direction, wherein an axial distance between a distal end of an inner joint portion located on an inner peripheral side of said stator core and an axial end surface of said stator core is different from an axial distance between a distal end of an outer joint portion located on an outer peripheral side of said stator core and the axial end surface of said stator core.

11. The alternator according to claim 10, wherein an outer joint portion where a distal end of a first conductor portion extending from a first layer of a first slot and a distal end of a second conductor portion extending from a second layer in a second slot are connected, and an inner joint portion where a distal end of a first conductor portion extending from a third layer of said first slot and a distal end of a second conductor portion extending from a fourth layer in said second slot are connected, are spaced apart from each other by half a slot.

12. The alternator according to claim 10, wherein the distal end of the first conductor portion and the distal end of the second conductor portion overlap in the radial direction to form said joint portion.

13. The alternator according to claim 10, wherein said joint portion is inclined from a diameter of said stator in a direction of rotation of said rotor, and said joint portion guides cooling air, which is generated by the rotation.

14. The alternator according to claim 10, wherein a gap is provided in the radial direction between an inner joint portion located on an inner peripheral side of said stator core and an outer joint portion located on an outer peripheral side of said stator core.

15. The alternator according to claim 10, wherein said first conductor portion and said second conductor portion form a substantially U-shaped conductor segment having leg ends bending away from each other, and said joint portions are formed by joining the leg ends by welding.

16. The alternator according to claim 10, wherein said joint portion is coated with an insulating resin.

17. The alternator according to claim 10, wherein said first conductor portion and said second conductor portion are formed of a continuous conductor, and are continuously connected in said joint portion.

* * * * *